(12) United States Patent
Stallings et al.

(10) Patent No.: US 8,677,277 B2
(45) Date of Patent: *Mar. 18, 2014

(54) INTERFACE CUBE FOR MOBILE DEVICE

(75) Inventors: Heath Stallings, Colleyville, TX (US);
Brian F. Roberts, Dallas, TX (US);
Donald H. Relyea, Jr., Dallas, TX (US);
Sok Y. Hwang, Dallas, TX (US);
Orland I. Angelo, Irving, TX (US)

(73) Assignee: Verizon Patent and Licensing Inc.,
Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/364,916

(22) Filed: Feb. 2, 2012

(65) Prior Publication Data

US 2012/0133652 A1    May 31, 2012

Related U.S. Application Data

(63) Continuation of application No. 12/344,705, filed on Dec. 29, 2008, now Pat. No. 8,132,120.

(51) Int. Cl.
*G06F 3/00* (2006.01)

(52) U.S. Cl.
USPC ............................................. 715/848

(58) Field of Classification Search
USPC ............................................. 715/848
See application file for complete search history.

(56) References Cited

U.S. PATENT DOCUMENTS

| | | |
|---|---|---|
| 5,461,709 A | 10/1995 | Brown |
| 6,430,405 B1 | 8/2002 | Jambhekar et al. |
| 6,720,863 B2 | 4/2004 | Hull et al. |
| 7,216,305 B1 | 5/2007 | Jaeger |
| 7,685,530 B2 | 3/2010 | Sherrard et al. |
| 7,797,642 B1 | 9/2010 | Karam et al. |
| 2003/0034878 A1 | 2/2003 | Hull et al. |
| 2004/0119755 A1 | 6/2004 | Guibourge |
| 2005/0114781 A1 | 5/2005 | Brownholtz et al. |
| 2005/0268237 A1 | 12/2005 | Crane et al. |
| 2007/0150830 A1 | 6/2007 | Ording et al. |
| 2008/0034314 A1 | 2/2008 | Louch et al. |
| 2008/0220751 A1 | 9/2008 | De Bast |
| 2008/0256107 A1 | 10/2008 | Banga et al. |
| 2009/0164923 A1 | 6/2009 | Ovi |
| 2009/0319929 A1 | 12/2009 | Wang et al. |
| 2010/0050129 A1 | 2/2010 | Li et al. |
| 2010/0058193 A1 | 3/2010 | Sherrard et al. |
| 2011/0119637 A1 | 5/2011 | Tuli et al. |

*Primary Examiner* — Ryan Pitaro (57) ABSTRACT

A computing device presents, on a screen, a three-dimensional rendering of an interface cube that includes a representation of a user's contacts displayed on at least one surface of the interface cube. The computing device receives a communication item from a peripheral application, where the communication item is associated with a particular contact of the user's contacts. The computing device creates a graphic based on the communication item and displays the graphic at a location on the representation of the user's contacts that corresponds to the location of the particular contact within a sequence of the user's contacts.

19 Claims, 11 Drawing Sheets

INTERFACE CUBE FOR MOBILE DEVICE

RELATED APPLICATION

This application is a continuation of co-pending U.S. patent application Ser. No. 12/344,705, filed on Dec. 29, 2008, entitled "INTERFACE CUBE FOR MOBILE DEVICE," the disclosure of which is hereby incorporated by reference herein.

BACKGROUND

Mobile devices (e.g., cell phones, personal digital assistants (PDAs), etc.) are being configured to support an increasing amount and variety of applications. For example, a mobile device may include telephone applications, organizers, email applications, instant messaging (IM) applications, games, cameras, image viewers, etc. Users typically may launch an application by selecting an icon (or shortcut) to activate the application or by selecting the application from a menu. Existing mobile device user interfaces may provide one of a variety of menu formats that group menu items into categories and sub-categories. These user interfaces may require a user to "drill down" through multiple menus to select a desired icon or other item.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Systems and/or methods described herein may provide an interface cube for a mobile device (e.g., a cell phone, a PDA, a personal computer, a laptop computer, a remote control, etc.). In one implementation, the interface cube may include different categories of information on different surfaces. Display elements (e.g., keys, icons, buttons, links, etc.) corresponding to the particular categories may be included on each surface of the interface cube. A user may rotate the interface cube using, for example, a touch-sensitive display, and select a desired display element. In one implementation, one or more surfaces of the interface cube may include a contacts page where display elements for a variety of incoming communications may be displayed and associated with particular contacts.

The term "display element," as used herein, may refer to any image presented on a screen of a device that, when selected by a user, provides access to a specific file, directory, window, option, program, or application. Each display element may be associated with executable applications capable of being executed by the mobile device. As used herein, the term "user" is intended to be broadly interpreted to include a mobile device or a user of a mobile device.

Figure 1:
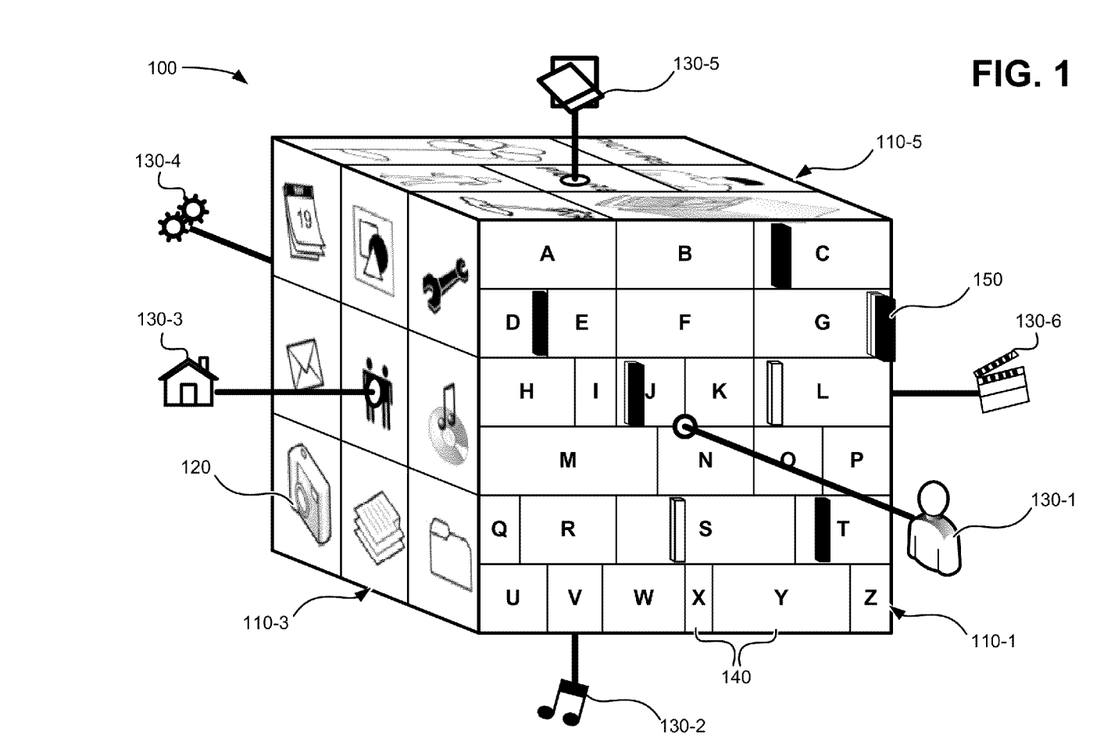
FIG. 1 is a diagram illustrating an exemplary implementation of the concepts described herein.

FIG. 1 provides a diagram illustrating an exemplary implementation of an interface cube 100. Interface cube 100 may be a three-dimensional rendering that can appear to be rotated while displayed on a two-dimensional display. Interface cube 100 may include multiple surfaces 110-1, 110-3, 110-5, along with other non-visible surfaces (referred to herein collectively as "surfaces 110," and singularly as "surface 110") that each includes multiple display elements 120 (referred to herein collectively as "display elements 120," and singularly as "display element 120"). In an exemplary implementation, each surface 110 may represent a category of display elements 120. As shown in FIG. 1, the arrangement of display elements 120 on a surface 110 need not be symmetrical or consistent with the arrangement of display elements 120 on another one of surfaces 110.

Each of surfaces 110 may include a handle 130-1, 130-2, 130-3, 130-4, 130-5, 130-6 (referred to herein collectively as "handles 130," and singularly as "handle 130"). Handles 130 may aid a user in manipulating (e.g., rotating) and/or selecting an active surface 110 of interface cube 100. For example, when using a touch interface, a user may "drag" a handle 130 by touching a handle and sliding the touch. Each handle 130 may represent an axis (e.g., an X, Y, or Z axis) of interface cube 100, so that dragging one handle 130 may cause interface cube to rotate about one or both of the remaining axes (e.g., dragging handle 130-1 may cause interface cube 100 to rotate about the axes represented by handles 130-3/130-6 and/or handles 130-2/130-5).

In the exemplary embodiment of FIG. 1, each handle 130 may also serve as an indicator for a category of surface 110. As shown in FIG. 1, handle 130-1 may indicate a surface 110-1 for contacts, handle 130-2 may indicate a surface 110 (not visible) for music (e.g., favorite songs, most recently played songs, etc.), handle 130-3 may indicate a surface 110-3 for a home menu (e.g., icons for commonly-used applications), handle 130-4 may indicate a surface 110 (not visible) for user settings, handle 130-5 may indicate a surface 110-5 for images (e.g., recently taken, sent, and/or received pictures), and handle 130-6 may indicate a surface 110 (not visible) for videos (e.g., particular TV programs, movies, video clips, etc.). As will be described further herein, selecting a handle 130 (e.g., by touching the handle on a touch-sensitive display and removing the touch) may cause the surface 110 associated with the handle to become active.

As shown in FIG. 1, surface 110-1 for contacts may include an alphabetical representation of a user's contacts. Contacts may be represented by alphabetical blocks 140 that may vary in size based, for example, on the number of contacts having a name (e.g., last name, first name, nickname, etc.) that begins with a particular letter. In the implementation shown in FIG. 1, blocks 140 corresponding to all twenty-six letters of the American English alphabet are shown. In other implementations, only blocks 140 corresponding to letters associated with a contact name may be shown. In other implementations, other sequencing schemes (e.g., non-alphabetical sequencing, most popular sequencing, numerical schemes, etc.) may be used to indicate a particular contact. In still other implementations, blocks 140 may be spread over two or more surfaces 110 of interface cube 100.

Surface 110-1 may include "stackable" communication indicators 150 to represent incoming communications for particular contacts. Communication indicators 150 may be a particular display element 120 that may be displayed when an incoming communication item (e.g., a text message, a voice-mail, an email, a missed call, an MMS, a calendar reminder, or another communication) is received. In an exemplary implementation, a communication indicator 150 for a particular contact may be placed on a block 140 at a location generally corresponding to the alphabetical sequence within a user's contacts list. For example, a block 140 for "T" may include only contacts "Terry," "Tim," and "Tom." A missed call from "Terry" may result in placement of a communication indicator 150 on the left side of the "T" block 140; a missed call from "Tim" may result in placement of a communication indicator 150 in the center of the "T" block 140; and a missed call from "Tom" may result in placement of a communication indicator 150 on the right side of the "T" block 140.

In one implementation, communication indicators 150 may be color-coded to represent particular communication types (e.g., blue for an email, red for a missed call, etc.) and have a three-dimensional appearance such that each communication indicator 150 may appear to extend from surface 110-1 of interface cube 100. As shown in FIG. 1, communication indicators 150 may be stacked so that communication indicators 150 for a single contact may be displayed appearing to extend further from surface 110-1 of interface cube 100. Thus, when interface cube 100 is rotated, communication indicators 150 may be shown protruding from surface 110-1. In one implementation, a communication indicator 150 for the most-recent communication may be applied to the top of a stack. As described further herein, a communication indicator 150 (or the top communication indicator 150 in a stack of communication indicators 150) may be selected by a user to display a communication item corresponding to the selected communication indicator 150. Once a particular communication item has been accessed (e.g., viewed, listened to, etc.), the corresponding communication indicator 150 may be removed from surface 110-1.

Although FIG. 1 shows an exemplary interface cube 100, in other implementations, interface cube 100 may contain fewer, different, differently arranged, or additional elements than depicted in FIG. 1. For example, interface cube 100 may include a different number, shape, and/or arrangement of surfaces 110 (e.g., interface cube 100 need not necessarily be a cube). Also, interface cube 100 may include a different number and/or arrangement of display elements 120 and communication indicators 150 associated with each surface 110. Furthermore, handles 130 may be positioned in different locations within interface cube 100 or excluded from interface cube 100.

Figure 2:
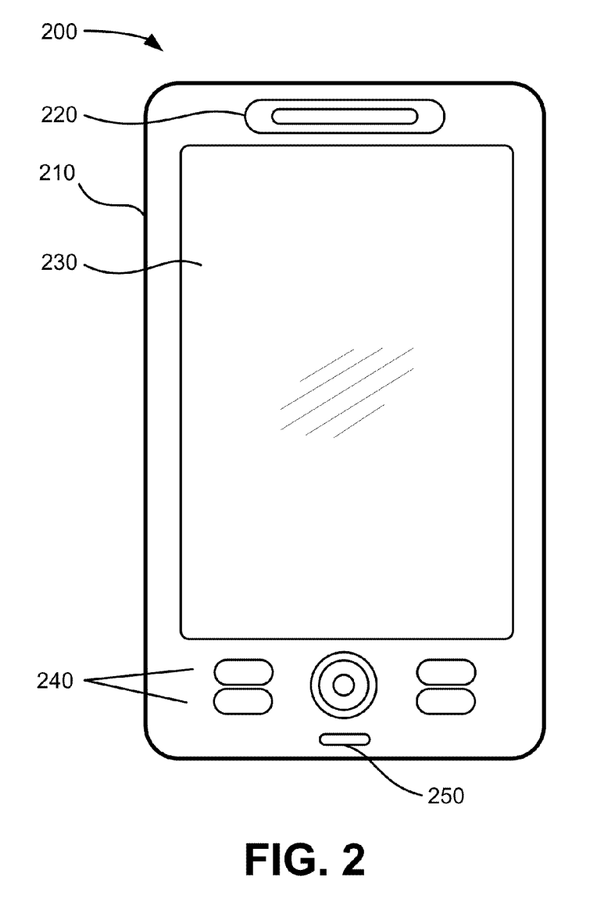
FIG. 2 depicts a diagram of an exemplary device in which systems and/or methods described herein may be implemented.

FIG. 2 is a diagram of an exemplary device 200 in which systems and/or methods described herein may be implemented. Device 200 may include a radiotelephone, a personal communications system (PCS) terminal (e.g., that may combine a cellular radiotelephone with data processing and data communications capabilities), a PDA (e.g., that can include a radiotelephone, a pager, Internet/intranet access, etc.), a remote control (e.g., for a television), a portable gaming system, a global positioning system (GPS) device, a printer, a facsimile machine, a pager, a camera (e.g., a contemporary camera or a digital camera), a video camera (e.g., a camcorder), a calculator, binoculars, a telescope, a personal computer, a laptop computer, any other device capable of utilizing a touch-panel, a thread or process running on one of these devices, and/or an object executed by one of these devices.

As illustrated in FIG. 2, device 200 may include a housing 210, a speaker 220, a display 230, control buttons 240, and/or a microphone 250. Housing 210 may protect the components of device 200 from outside elements. Housing 210 may include a structure configured to hold devices and components used in device 200, and may be formed from a variety of materials. For example, housing 210 may be formed from plastic, metal, or a composite, and may be configured to support speaker 220, display 230, control buttons 240 and/or microphone 250.

Speaker 220 may provide audible information to a user of device 200. Speaker 220 may be located in an upper portion of device 200, and may function as an ear piece when a user is engaged in a communication session using device 200. Speaker 220 may also function as an output device for music and/or audio information associated with games and/or video images played on device 200.

Display 230 may provide visual information to the user. For example, display 230 may display text inputted into device 100, text, images, video, and/or graphics received from another device, and/or information regarding incoming or outgoing calls or text messages, emails, media, games, phone books, address books, the current time, etc. For example, screen 310 may include a liquid crystal display (LCD), such as a thin film transistor (TFT) LCD, etc.

In one implementation, display 230 may include a touch screen display that may be configured to receive a user input when the user touches (or comes in close proximity to) display 230. For example, the user may provide an input to display 230 directly, such as via the user's finger, or via other devices, such as a stylus. User inputs received via display 230 may be processed by components and/or devices operating in device 200. The touch-screen-enabled display 230 may permit the user to interact with device 200 in order to cause device 200 to perform one or more operations. Exemplary technologies to implement a touch screen on display 230 may include, for example, a near-field-sensitive (e.g., capacitive) overlay, an acoustically-sensitive (e.g., surface acoustic wave) overlay, a photo-sensitive (e.g., infra-red) overlay, a pressure sensitive (e.g., resistive) overlay, and/or any other type of touch panel overlay that allows display 230 to be used as an input device. The touch-screen-enabled display 230 may also include the ability to identify movement of a body part or a pointing device as it moves on or near the surface of the touch-screen-enabled display 230.

Control buttons 240 may permit the user to interact with device 200 to cause device 200 to perform one or more operations. For example, control buttons 240 may be used to cause device 200 to transmit information. Microphone 250 may receive audible information from the user. For example, microphone 250 may receive audio signals from the user and may output electrical signals corresponding to the received audio signals.

Although FIG. 2 shows exemplary components of device 200, in other implementations, device 200 may contain fewer, different, differently arranged, or additional components than depicted in FIG. 2. For example, in some implementations device 200 may include a keypad, such as a standard telephone keypad, a QWERTY-like keypad (e.g., a traditional configuration of typewriter or computer keyboard keys), or another keypad layout. In still other implementations, a component of device 200 may perform one or more tasks described as being performed by another component of user device 200.

Figure 3:
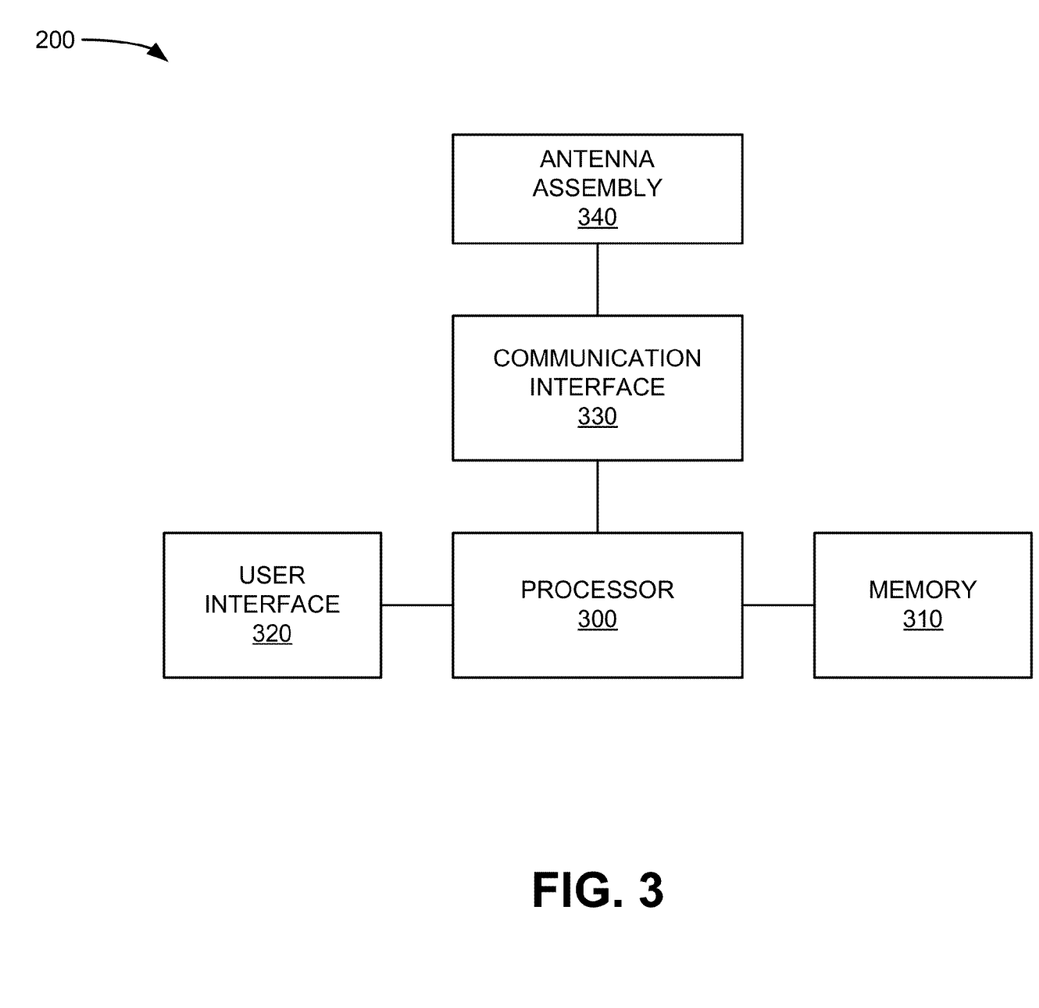
FIG. 3 depicts a diagram of exemplary components of the device illustrated in FIG. 2.

FIG. 3 is a diagram of exemplary components of device 200. As illustrated, device 200 may include a processor 300, a memory 310, a user interface 320, a communication interface 330, and/or an antenna assembly 340.

Processor 300 may include one or more microprocessors, application specific integrated circuits (ASICs), field programmable gate arrays (FPGAs), or the like. Processor 300 may control operation of device 200 and its components. In one implementation, processor 300 may control operation of components of device 200 in a manner described herein.

Memory 310 may include a random access memory (RAM), a read-only memory (ROM), and/or another type of memory to store data and instructions that may be used by processor 300. In one implementation, memory 310 may store data used to display a graphical user interface, such as quick-access menu arrangement 100 on display 230.

User interface 320 may include mechanisms for inputting information to device 200 and/or for outputting information from device 200. Examples of input and output mechanisms might include buttons (e.g., control buttons 240, keys of a keypad, a joystick, etc.); a speaker (e.g., speaker 220) to receive electrical signals and output audio signals; a microphone (e.g., microphone 250) to receive audio signals and output electrical signals; a display (e.g., display 230) to receive touch input and/or to output visual information (e.g., communication items received by device 200); a vibrator to cause device 200 to vibrate; and/or a camera to receive video and/or images.

Communication interface 330 may include, for example, a transmitter that may convert baseband signals from processor 300 to radio frequency (RF) signals and/or a receiver that may convert RF signals to baseband signals. Alternatively, communication interface 330 may include a transceiver to perform functions of both a transmitter and a receiver. Communication interface 330 may connect to antenna assembly 340 for transmission and/or reception of the RF signals.

Antenna assembly 340 may include one or more antennas to transmit and/or receive RF signals over the air. Antenna assembly 340 may, for example, receive RF signals from communication interface 330 and transmit them over the air, and receive RF signals over the air and provide them to communication interface 330. In one implementation, for example, communication interface 330 may communicate with a network and/or devices connected to a network.

As will be described in detail below, device 200 may perform certain operations described herein in response to processor 300 executing software instructions of an application contained in a computer-readable medium, such as memory 310. A computer-readable medium may be defined as a physical or logical memory device. A logical memory device may include a space within a single physical memory device or spread across multiple physical memory devices. The software instructions may be read into memory 310 from another computer-readable medium or from another device via communication interface 330. The software instructions contained in memory 310 may cause processor 300 to perform processes that will be described later. Alternatively, hardwired circuitry may be used in place of or in combination with software instructions to implement processes described herein. Thus, implementations described herein are not limited to any specific combination of hardware circuitry and software.

Although FIG. 3 shows exemplary components of device 200, in other implementations, device 200 may contain fewer, different, differently arranged, or additional components than depicted in FIG. 3. In still other implementations, a component of device 200 may perform one or more other tasks described as being performed by another component of device 200.

Figure 4:
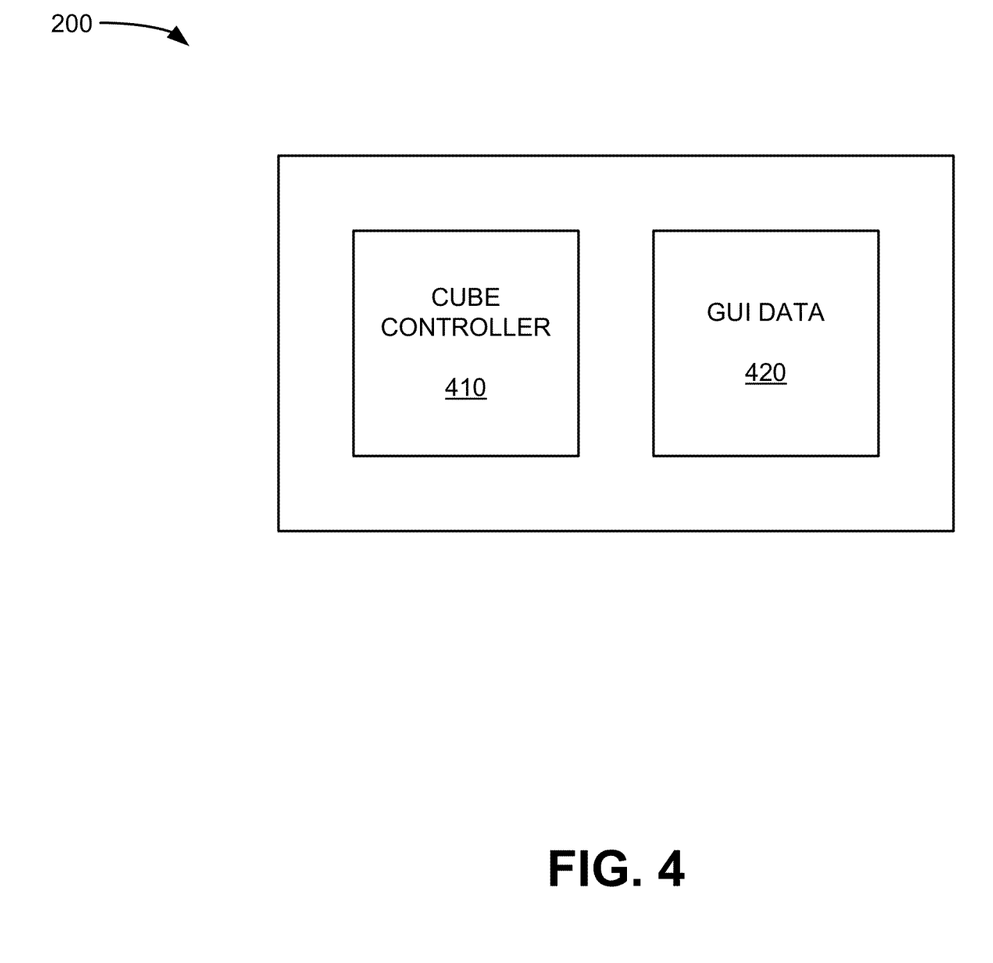
FIG. 4 depicts a diagram of exemplary functional components of the device illustrated in FIG. 2.

FIG. 4 provides a diagram of exemplary functional components of device 200. As shown in FIG. 4, device 200 may include a cube controller 410 and graphical user interface (GUI) data 420. Device 200 may also include other peripheral applications (not shown) associated with one or more display elements 120. Peripheral applications may include, for example, a telephone application, a text-messaging application, an email application, an instant messaging (IM) application, a calendar application, a multimedia messaging service (MMS) application, a short message service (SMS) application, an image viewing application, a camera application, an organizer, a video player, an audio application, a GPS application, a gaming application, a web browser, etc.

Cube controller 410 may generate and update a graphical user interface for an interface cube (e.g., interface cube 100). Interface cube 100 may be, for example, a multi-sided three-dimensional rendering that can appear to be rotated while displayed on a two-dimensional display. In one implementation, cube controller 410 may assemble display elements 120 on each surface 110 based on one or more templates. Templates may include for example, arrangements for groups of display elements 120 associated with each surface 110 of interface cube 100. In an exemplary implementation, cube controller 410 may retrieve, from GUI data 420, a display element 120 (e.g., an icon) representing a peripheral application, may apply stored user preferences, and may insert the display element 120 into a graphic template for an application interface. In another exemplary implementation, cube controller 410 may retrieve, from GUI data 420, a different display element 120 (e.g., an indicator) representing a communication item, may apply stored user preferences, and may insert the display element 120 into a graphic template for a contact interface.

Cube controller 410 may receive input to identify what display elements 120 may be assigned to a particular group associated with a surface 110 of interface cube 100. Cube controller 410 may store group assignments, for example, in GUI data 420. Cube controller 410 may also include logic to present surfaces 110 of interface cube 100 in an activated or deactivated mode. Cube controller 410 may also store trigger information to detect, for example, when a surface 110 of interface cube 100 is activated/deactivated and/or when a display element 120 is to be added to a surface 110 of interface cube 100. When a particular surface 110 is in an activated mode, cube controller 410 may receive user input to the particular surface 110 and may, for example, launch a program and/or object in response to the user input.

GUI data 420 may include information that may be used by cube controller 410 to compile interface cube 100. GUI data 420 may include, for example, templates for each surface 110, application icons, display element groupings, display triggers, configurations for interface cube 100, and/or user preferences. User preferences may include, for example, format preferences for interface cube 100, such as font/icon sizes, display element groupings, titles/categories for each surface 110, handle 130 icons, and/or default orientation of interface cube 100. In some implementations, display element groupings (e.g., the particular icons associated with a particular surface 110) may be entirely user-configurable. In other implementations, the display element groupings may include a combination of default icons and user-selected icons.

Although FIG. 4 shows exemplary functional components of device 200, in other implementations, device 200 may contain fewer, different, differently arranged, or additional functional components than depicted in FIG. 4. In still other implementations, a functional component of device 200 may perform one or more tasks described as being performed by another functional component of device 200.

Figure 5A:
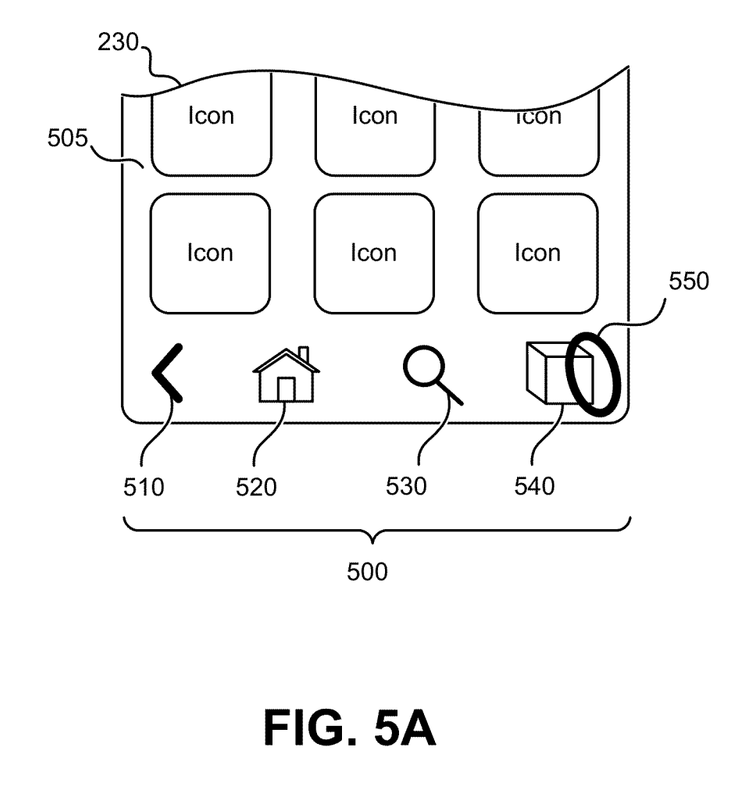
FIGS. 5A and 5B provide examples of an interface cube activation arrangement according to implementations described herein.
Figure 5B:
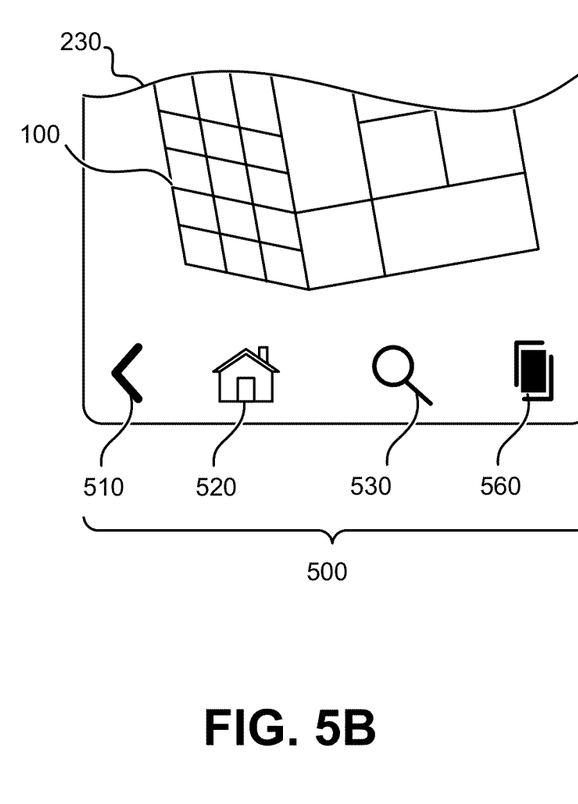

FIGS. 5A and 5B provide examples of an interface cube activation arrangement according to implementations described herein. FIG. 5A provides a partial view of display 230 with a set of command icons 500 and a standard user interface 505 (i.e., with no interface cube). FIG. 5B provides a partial view of display 230 with the set of command icons 500 and a partial view of interface cube 100. Command icons 500 may include, for example, a back icon 510 to return to a previous display view, a home button 520 to jump directly to a designated main/home screen, a search button 530 to jump directly to a search screen, and/or an interface cube activation icon 540 to toggle between an interface cube display and another user interface (e.g., standard user interface 505).

As shown in FIG. 5A, when interface cube mode is not activated standard user interface 505 may be displayed. Standard user interface 505 may include some of the information (presented in a different format) that may also be displayed on one or more surfaces 110 of interface cube 100. When a user selects interface cube activation icon 540 (e.g., via a touch 550 on a touch-sensitive implementation of display 230), standard interface 505 may be replaced with interface cube 100.

As shown in FIG. 5B, after a user selects interface cube activation icon 540 to display interface cube 100, interface cube activation icon 540 may be replaced in the set of command icons 500 with a standard interface activation icon 560. Standard interface activation icon 560 may allow a user to exit from interface cube 100 back to standard user interface 505.

Although FIGS. 5A and 5B shows exemplary arrangements of control buttons 500, in other implementations, control buttons 500 may contain fewer, different, differently arranged, or additional control buttons than depicted in FIGS. 5A and 5B. For example, in other implementations, control buttons 500 may include a call activation button to jump to a call screen on device 200. In still other implementations, interface cube 100 may be activated/deactivated using a physical button, such as one of control buttons 240.

Figure 6A:
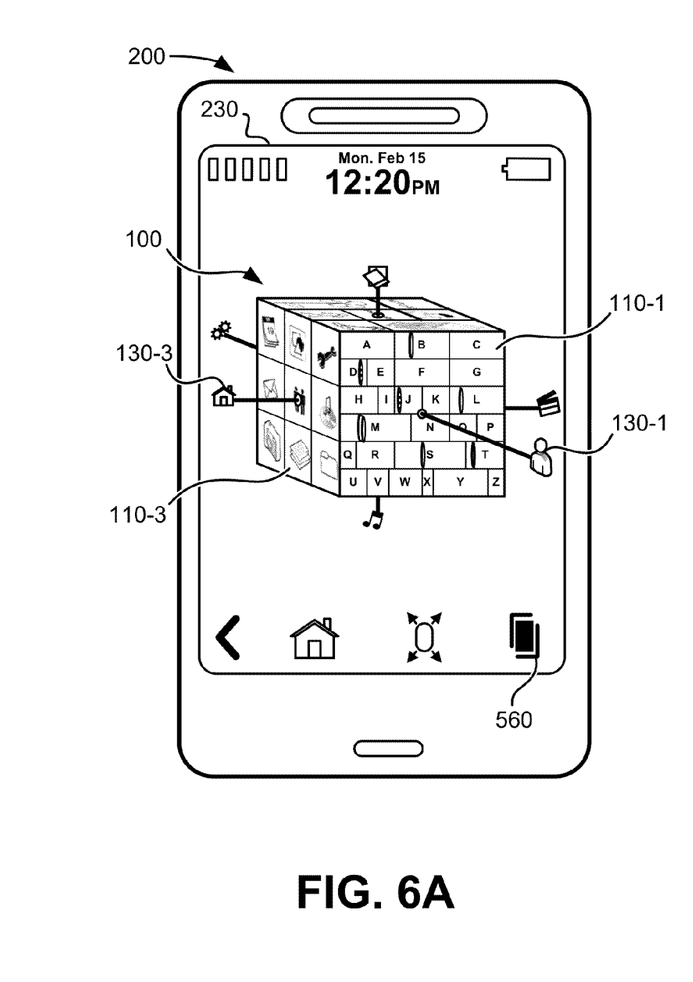
FIGS. 6A-6F illustrate exemplary interface cube operations capable of being performed by the device depicted in FIG. 2.
Figure 6B:
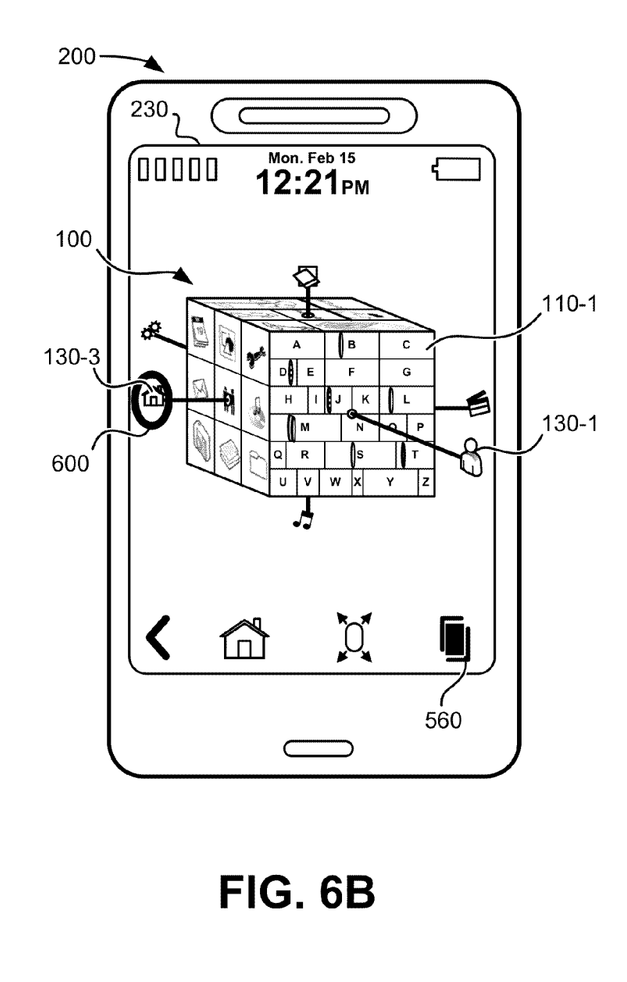

FIGS. 6A-6F illustrate exemplary interface cube operations capable of being performed by a device, such as device 200. Operations may be performed for example, using cube controller 410 operating on processor 300. FIGS. 6A and 6B provide a view of interface cube 100 presented on display 230. Interface cube 100 may include features consistent with those described above with respect to FIG. 1. In FIGS. 6A and 6B, interface cube 100 is shown in an unanchored state, which, in one implementation, may be the default state of interface cube 100 after interface cube 100 is activated by interface cube activation icon 540. In the unanchored state, interface cube 100 may be rotated (e.g., via movement of one of handles 130) to allow a user to view one or more of surfaces 110 at a time. FIG. 6B shows a user input 600 being applied to select one of handles 130. Particularly, the selected handle 130-3 may correspond to a surface 110-3 of interface cube 100 for a home menu.

Figure 6C:
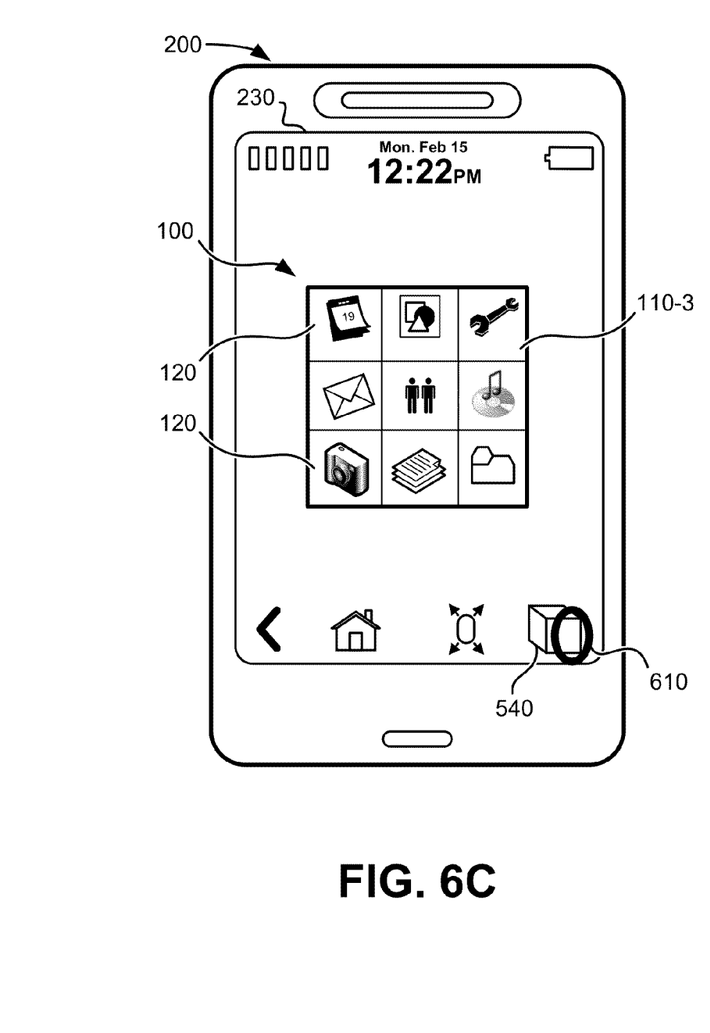

FIG. 6C provides a view of an interface cube 100 in an anchored state. As shown in FIG. 6C, selection of handle 130-3 may cause device 200 to provide a straight-on (e.g., substantially two-dimensional) view of the home menu surface 110-3 corresponding to handle 130-3. In the anchored stated, a user may provide input to (e.g., select) one of display elements 120 on the displayed surface 110. In one implementation, as shown in FIG. 6C, handles 130 may be removed from the interface cube 100 when interface cube 100 is in the anchored state. In another implementation, also shown in FIG. 6C, the displayed surface 110-3 of interface cube 100 in the anchored state may be enlarged to more easily accept user input. In other implementations, the appearance of interface cube 100 may not be changed in an anchored state and user input to a display element 120 on a surface 110 may be accepted whenever the display element 120 is visible. In an implementation, when interface cube 100 is in an anchored state, standard interface activation icon 560 may be replaced with interface cube activation icon 540 or a different icon. Assuming a user does not want to select a display element 120 from surface 110-3, another user input 610 (e.g., another touch by a user) on interface cube activation icon 540 may cause interface cube 100 to revert back to an unanchored state.

Figure 6D:
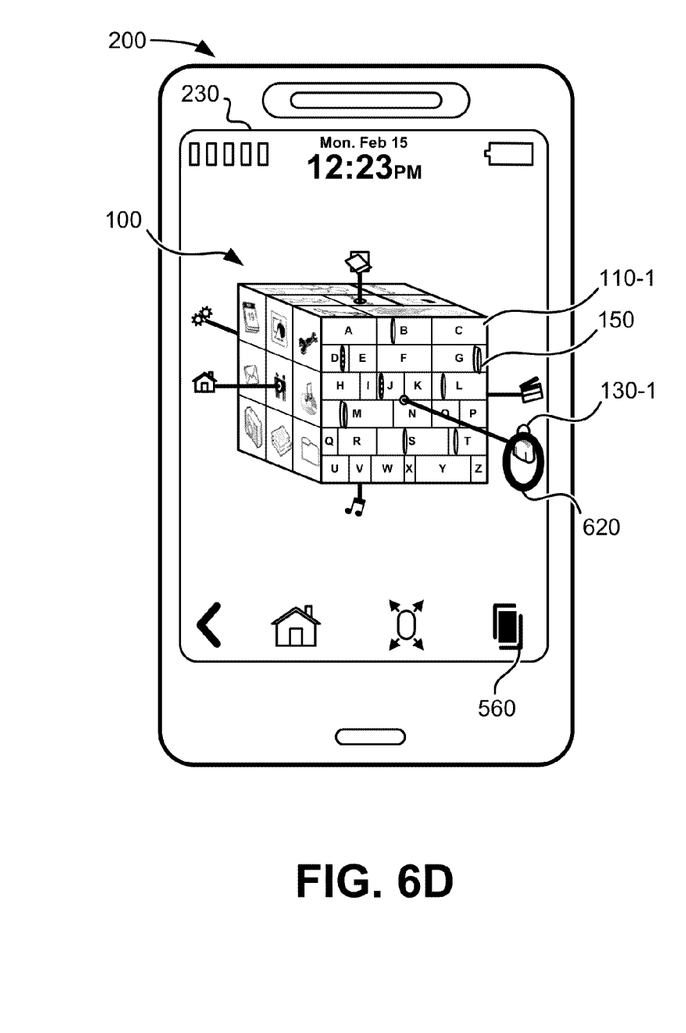

FIG. 6D provides a view of an interface cube 100 in an anchored state with user input 620 (e.g., another touch by a user) being applied to handle 130-1. Handle 130-1 may correspond to surface 110-1 for contacts. Selection of handle 130-1 may cause device 200 to provide the straight-on (e.g., substantially two-dimensional) view of contact surface 110-1 shown in FIG. 6E.

Figure 6E:
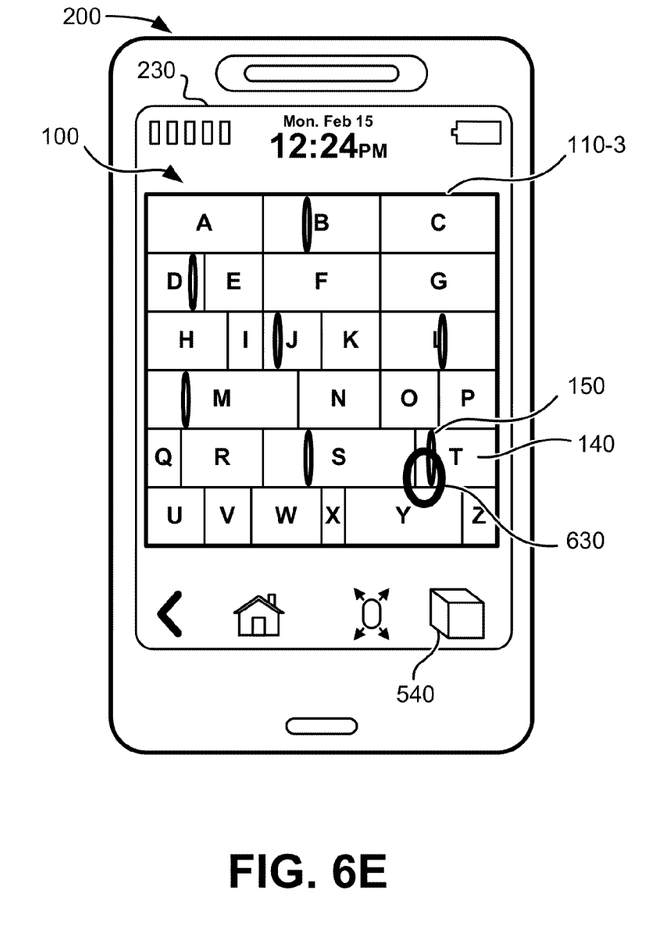

FIG. 6E provides a view of an interface cube 100 in an anchored state showing contact surface 110-1. Surface 110-1 may be enlarged in this particular exemplary implementation. Because surface 110-1 may now be presented as a two-dimensional surface, only the top (e.g., most recent) communication indicator 150 in a vertical stack of communication indicators 150 may be shown. In other implementations, communication indicators 150 may be arranged differently to provide an indication of the number of communication indicators 150 in a stack of communication indicators 150. A shown in FIG. 6E, a user input 630 may be applied to a communication indicator 150 at "T" block 140. Based on color-coding, for example, a user may be able to identify the communication indicator 150 as indicative of a MMS message. Using the example of "T" block 140 from FIG. 1, a user may also be able to identify the MMS message is from "Terry" based on the location of the communication indicator 150 within "T" block 140.

Figure 6F:
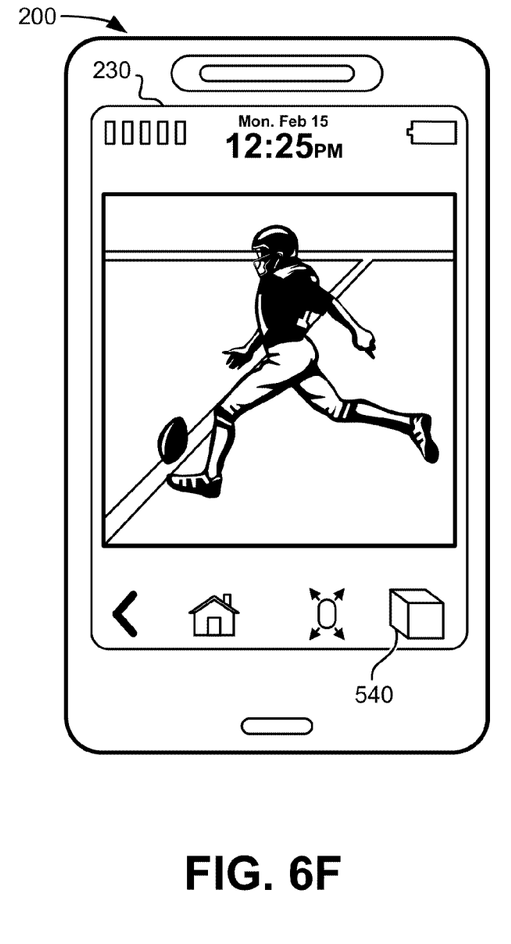

FIG. 6F provides a view of an application displaying an MMS message corresponding to the communication indicator 150 selected by user input 630 of FIG. 6E. After viewing the message content, a user may return to a display of interface cube 100 by, for example, selecting interface cube activation icon 540.

Although FIGS. 6A-6F show exemplary interface cube operations associated with device 200, in other implementations, device 200 may perform fewer, different, or additional operations than depicted in FIGS. 6A-6F.

Figure 7:
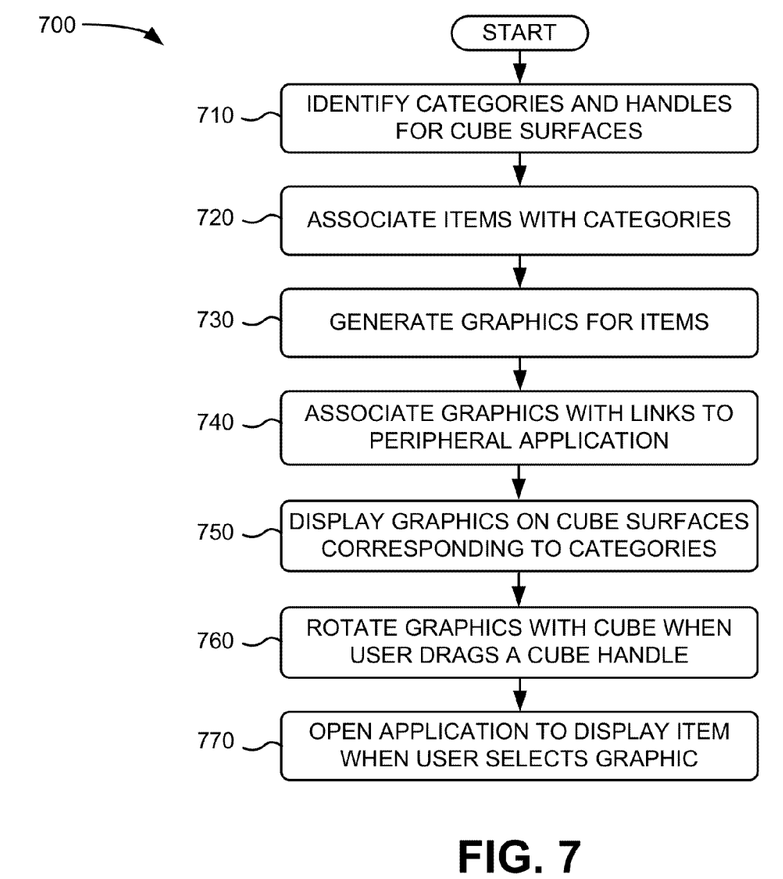
FIG. 7 depicts a flow chart of an exemplary process for providing an interface cube according to implementations described herein.

FIG. 7 depicts a flow chart of an exemplary process 700 for providing an interface cube according to implementations described herein. In one implementation, process 700 may be performed by device 200 using, for example, cube controller 410. In another implementation, some or all of process 700 may be performed by another device or group of devices, including or excluding device 200.

As illustrated in FIG. 7, process 700 may begin with identifying categories and handles for cube surfaces (block 710). For example, device 200 may identify categories for each surface of interface cube 100 and handles corresponding to each category. In one implementation, categories and/or handles may be defined by an original-equipment manufacturer (OEM) or software developer. In another implementation, categories and/or handles may include a combination of default settings and stored user preferences. Category definitions and handles may be retrieved, for example, from GUI data 420 within memory 310.

Items may be associated with the categories (block 720). For example, device 200 may associate items such as communications items, application icons, photographs, links, and other objects with the categories. In one implementation, some or all items may be associated with categories based on an assignments instructed by a user or software developer. In another implementation, some items may be associated with categories based on guidelines that device 200 may interpret. For example, device 200 may be instructed to determine most-recently viewed pictures, most-played songs, etc. to associate with a category.

Graphics may be generated for the items (block 730). For example, device 200 may generate graphics for the items to match the configuration of interface cube 100. For example, device 200 may generate graphics for pictures that include thumbnail views, cropped views, and/or descriptions of the images. As another example, device 200 may generate a contacts graphic to represent an alphabetical sequence of blocks that are proportionately sized to correspond to the number of contacts associated with each letter in a user's contacts list.

The graphics may be associated with links to peripheral applications (block 740). For example, device 200 may associate the graphics with a link to activate the peripheral application associated with the item to which the graphic pertains. In another implementation, device 200 may associate the graphic with another application, such an interactive profile card application that can present communication items from multiple applications. Associating the graphic with a link to the peripheral application may be optional for some items.

The graphics may be displayed on the cube surfaces corresponding to the categories (block 750). For example, device 200 may display the graphics on a surface of a three-dimensional rendering of an interface cube (e.g., interface cube 100) that can be rotated to display all apparent surfaces of the cube. Thus, although a certain number of surfaces (e.g., six surfaces) may be generated, only a portion of the surfaces (e.g., three surfaces) may be displayed at any one time.

The graphics may be rotated with the cube when a user drags a cube handle (block 760). For example, device 200 may rotate interface cube 100 when a user touches (on a touch-sensitive display) a handle 130 and slides the touch along the surface of the display. As described with respect to FIG. 1, in one implementation, handles 130 may correspond to an axis for interface cube 100, so that movement of one handle 130 causes interface cube 100 to rotate about one or both of the remaining axes.

An application to display an item may be opened when a user selects a graphic (block 770). For example, device 200 may identify user input (e.g., a touch) to select a particular graphic on a surface of interface cube 100. In one implementation, a user may first anchor interface cube 100 (e.g., by selecting a handle associated with a particular surface of interface cube 100, pressing a particular control button, orienting the cube to present only one surface, etc.) before a graphic on the surface of the cube can be selected. In other implementations, a user may select a graphic without anchoring the interface cube.

Figure 8:
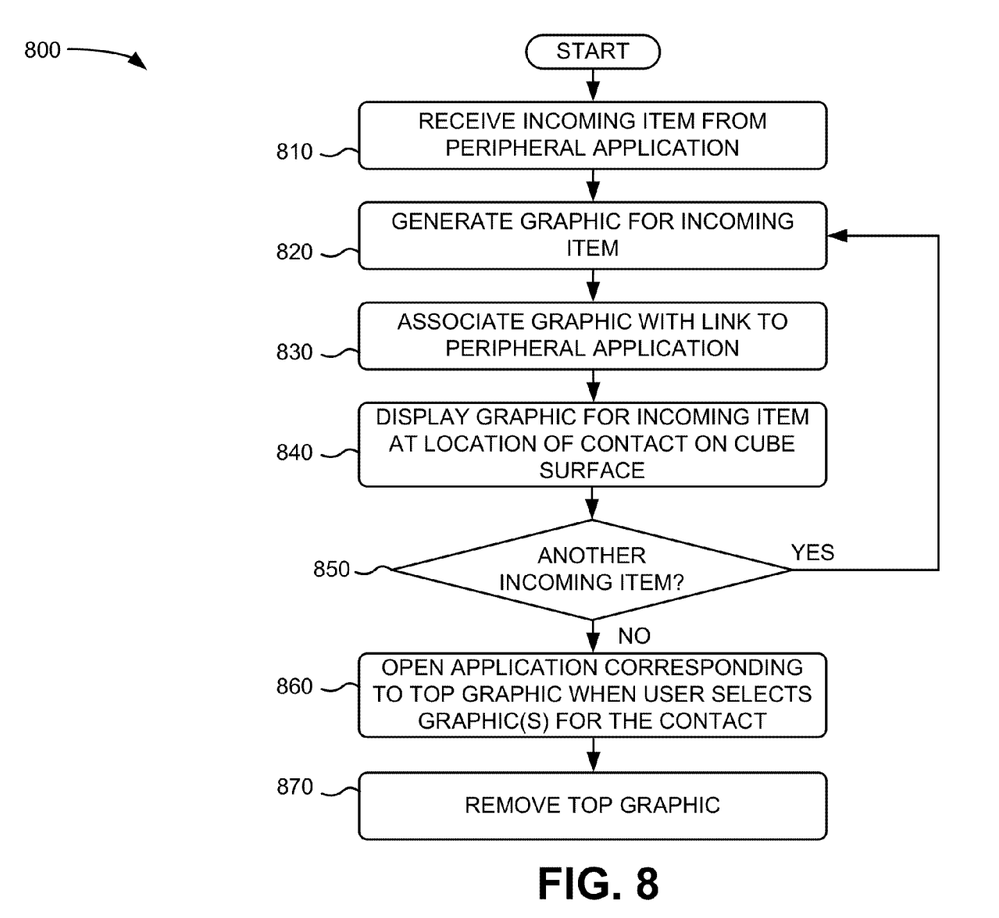
FIG. 8 depicts a flow chart of an exemplary process for managing incoming contacts on an interface cube according to implementations described herein.

FIG. 8 depicts a flow chart of an exemplary process 800 for managing incoming communications on an interface cube according to implementations described herein. In one implementation, process 800 may be performed by device 200 using, for example, cube controller 410. In another implementation, some or all of process 800 may be performed by another device or group of devices, including or excluding device 200.

Process 800 may begin by receiving an incoming item from a peripheral application (block 810). For example, device 200 may receive a message indication from a peripheral application, such as a telephone application, an email application, or an SMS application of device 200. Alternatively, device 200 may receive a reminder indication from a calendar application. In an exemplary implementation, if device 200 receives a telephone call that is not picked up by the user, the telephone application may provide an indication of the missed telephone call to cube controller 410. Cube controller 410 may retrieve information about the missed telephone call, including, for example, the telephone number or identity of the caller (e.g., "Terry").

A graphic for the incoming item may be generated (block 820). For example, device 200 may create a graphic (e.g., communication indicator 150) based on information about the item. In one implementation, as described with respect to FIG. 1, the graphic may include color-coding to identify the type of item (e.g., text message, email, missed call, MMS, etc.). In another implementation, the graphic may include different shapes or symbols to represent the type of incoming item. In the exemplary implementation of a missed telephone call, device 200 may assemble information about the missed call into a graphic that includes a color corresponding to a missed call (e.g., red) along with placement information based on the identity of the caller and the arrangement of contact blocks (e.g., blocks 140) on the user's contacts surface 110-1 of interface cube 100.

The graphic may be associated with a link to a peripheral application (block 830). For example, device 200 may associate the graphic with a link to activate the peripheral application associated with the item to which the graphic pertains. In the exemplary implementation of a missed telephone call, device 200 may associate the blue-colored communication indicator 150 for the missed call with the telephone application that initiated the missed call message. Thus, by selecting the graphic (e.g., by the user touching communication indicator 150 on a touch-enabled display 230), a user may activate the telephone application. Associating the graphic with a link to the peripheral application may be optional to process 800.

The graphic for the incoming item may be displayed at a location on the cube surface (block 840). For example, device 200 may display one of communication indicators 150 at a location on the user's contacts surface 110-1 of interface cube 100 that corresponds to the location of the relevant contact within an alphabetical sequence. In the exemplary implementation of a missed telephone call from "Terry," device 200 may display the graphic for the missed telephone call (e.g., a blue communication indicator 150) on surface 110-1 at the (user's) left side of "T" block 140 (as shown, e.g., in FIG. 6E).

It may be determined if another item is received (block 850). For example, device 200 may determine if additional items are available to be processed. Incoming items may be from the same contact as the previous items or from a different contact. If it is determined that another item is received (block 850-YES), process 800 may return to process block 820 to generate another graphic for the next incoming item for that contact. Process 800 may proceed from process block 820 in the same manner as described above, with the exception that graphics (e.g., communication indicators 150) for items received from a contact that already has a graphic may be "stacked" on or beneath the previous graphic.

If it is determined that no other item for the same contact is received (block 850-NO), the application corresponding to the top graphic may be opened when a user selects the graphic(s) for the contact (block 860) and the top graphic may be removed (block 870). For example, assuming a missed call communication indicator 150 is the top (or only) graphic associated with a particular contact, device 200 may open a telephone application when the user selects the graphic. The missed call communication indicator 150 may be removed from interface cube, for example, once there is an indication from the peripheral application corresponding the selected graphic (e.g., the telephone application) that the user has accessed the missed call information.

Figure 9:
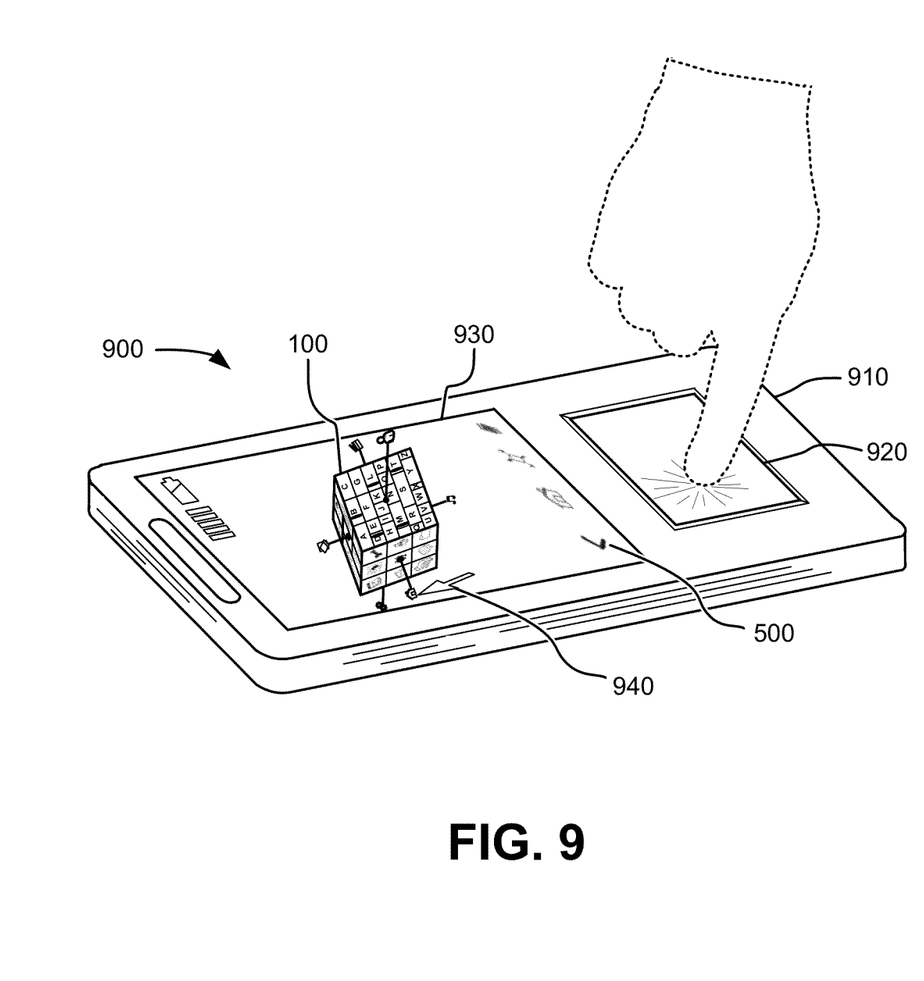
FIG. 9 provides an illustration of an exemplary implementation of an interface cube on a mobile device.

FIG. 9 provides an illustration of an exemplary implementation of user input for an interface cube on a device 900 with a touch panel separate from a display. Device 900 may include housing 910, touch panel 920, and display 930. Other components, such as control buttons, a keypad, a microphone, a camera, connectivity ports, memory slots, and/or speakers, may be located on device 900, including, for example, on a rear or side panel of housing 910. Although FIG. 9 shows exemplary components of device 900, in other implementations, device 900 may contain fewer, different, differently arranged, or additional components than depicted in FIG. 9.

FIG. 9 illustrates touch panel 920 being separately located from display 930 on housing 910. Touch panel 920 may include any resistive touch panel technology or other technology providing the ability to register a set of touch coordinates. User input on touch panel 920 may be associated with display 930 by, for example, movement and location of a cursor 940 on display 930. User input on touch panel 920 may be in the form of the touch of nearly any object, such as a body part (e.g., a finger, as shown) or a pointing device (e.g., a stylus, pen, etc.).

Touch panel 920 may be operatively connected with display 930 to allow the combination of touch panel 920 and display 930 to be used as an input device. Touch panel 920 may include the ability to identify movement of an object as the object moves on the surface of touch panel 920. As described above with respect to, for example, FIGS. 6A-6F, device 900 may display on display 930 an interface cube 100 that accepts (via touch panel 920) user input to a display elements located on any of several surfaces. In the implementation of FIG. 9, the touch on touch panel 920 may correspond to the selection of a handle of the interface cube 100. A user may use touch panel 920 and cursor 940 to manipulate interface cube 100 and/or control buttons 500 in a manner similar to that described above with respect to, for example, FIGS. 6A-6F.

Systems and/or methods described herein may present, on a screen, a three-dimensional rendering of an interface cube that includes a representation of a user's contacts displayed on at least one surface of the interface cube. Communication items associated with a particular contact may be received from a peripheral application, and a graphic may be created based on the communication item. The graphic may then be displayed at a location on the representation of the user's contacts that corresponds to the location of the particular contact within a sequence of the user's contacts. Thus, the user may be presented with an intuitive interface that can provide convenient access to applications and content available on the user device while presenting an overview of incoming communication activity.

The foregoing description of implementations provides illustration and description, but is not intended to be exhaustive or to limit the invention to the precise form disclosed. Modifications and variations are possible in light of the above teachings or may be acquired from practice of the invention.

For example, while implementations have been described primarily in the context of a mobile device (such as a radiotelephone, a PCS terminal, or a PDA), in other implementations the systems and/or methods described herein may be implemented on other computing devices such as a laptop computer, a personal computer, a tablet computer, an ultramobile personal computer, or a home gaming system.

Also, while series of blocks have been described with regard to FIGS. 7 and 8, the order of the blocks may be modified in other implementations. Further, non-dependent blocks may be performed in parallel.

It will be apparent that aspects described herein may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware may be designed to implement these aspects based on the description herein.

Further, certain portions of the invention may be implemented as "logic" that performs one or more functions. This logic may include hardware, such as an application specific integrated circuit or a field programmable gate array, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
presenting, by a computing device, a multi-surface interface for display,
   at least one surface, of the multi-surface interface, including a representation of contacts associated with the device, and
   the representation including a plurality of regions associated with respective subsets of the contacts;
receiving, by the computing device, a communication associated with a particular contact of the contacts,
   the particular contact being associated with a particular subset of the respective subsets of the contacts, and
   the particular subset being associated with a particular region of the plurality of regions;
creating, by the computing device, a graphic associated with the communication;
presenting, by the computing device, the graphic for display at a location in the particular region,
   the location corresponding to a position of the particular contact within a sequence of the particular subset;
receiving, by the computing device, another communication associated with the particular contact;
creating, by the computing device, another graphic based on the other communication; and
presenting, by the computing device, the other graphic at the location, the graphic and the other graphic being included in a stack, and an order of the graphic and the other graphic in the stack corresponding to an order in which the communication and the other communication are received.

2. The method of claim 1, further comprising:
associating the graphic with a link to an application,
where a selection of the graphic causes the application to be initiated.

3. The method of claim 2, where the graphic is color-coded to designate at least one of:
an application type associated with the application, or
a communication type associated with the communication.

4. The method of claim 2, where the application includes at least one of:
a telephone application,
a text-messaging application,
an email application,
an instant messaging (IM) application,
a calendar application,
a multimedia messaging service (MMS) application,
a short message service (SMS) application, or
a web browser.

5. The method of claim 1, where the plurality of regions correspond to an alphabetical sequence of blocks.

6. The method of claim 1, where the multi-surface interface comprises respective graphical images.

7. The method of claim 6, further comprising:
receiving a user input associated with a selection of one of the respective graphical images; and
presenting an enlarged view of a corresponding surface, of the multi-surface interface, for display.

8. The method of claim 1, where the multi-surface interface corresponds to a rotatable cube.

9. A device comprising:
a memory; and
a processor to:
present, on a display, an interface that includes a representation of contacts associated with the device,
the representation including a plurality of regions associated with respective subsets of the contacts;
receive a communication,
the communication being associated with a particular contact of the contacts,
the particular contact being associated with a particular subset of the respective subsets of the contacts, and
the particular subset being associated with a particular region of the plurality of regions,
create a graphic associated with the communication;
present, on the display, the graphic at a location in the particular region,
the location corresponding to a position of the particular contact within a sequence of the particular subset;
receive another communication associated with the particular contact;
create another graphic based on the other communication; and
present the other graphic at the location,
the graphic and the other graphic being included in a stack, and
an order of the graphic and the other graphic in the stack corresponding to an order in which the communication and the other communication are received.

10. The device of claim 9, where the communication is received from an application, and
where the application includes at least one of:
a telephone application,
a text-messaging application,
an email application,
an instant messaging (IM) application,
a calendar application,
a multimedia messaging service (MMS) application,
a short message service (SMS) application, or
a web browser.

11. The device of claim 9, where the display includes a touch-sensitive display to receive a user input related to the representation.

12. The device of claim 9, where the processor is further to:
associate the graphic with an application,
detect a selection of the graphic, and
launch the application based on detecting the selection of the graphic.

13. The device of claim 9, where the interface includes a rotatable multi-surface interface, and
where the processor is further to:
receive a user input to anchor the rotatable multi-surface interface, and
anchor the rotatable multi-surface interface based on receiving the user input.

14. The device of claim 9, where the plurality of regions correspond to an alphabetical sequence of blocks.

15. The device of claim 9, where the interface includes a rotatable multi-surface interface, and
where the processor is further to:
receive a user input to rotate the rotatable multi-surface interface, and
rotate the rotatable multi-surface interface based on receiving the user input.

16. The device of claim 15, where the rotatable multi-surface interface corresponds to a cube.

17. A non-transitory storage device for storing instructions, the instructions comprising:
one or more instructions, which when executed by a processor, cause the processor to present, on a display, a rotatable multi-surface interface that includes a representation of contacts associated with a device,
the representation being displayed on at least one surface of the rotatable multi-surface interface, and
the representation including an alphabetical sequence of blocks associated with the contacts;
one or more instructions, which when executed by the processor, cause the processor to receive a first communication and a second communication,
the first communication and the second communication being associated with a particular contact of the contacts;
one or more instructions, which when executed by the processor, cause the processor to create a first graphic associated with the first communication and a second graphic associated with the second communication; and
one or more instructions, which when executed by the processor, cause the processor to display a stack that includes the first graphic and the second graphic,
the stack being positioned at a location on the representation of the contacts,
the location corresponding to a position of the particular contact within the alphabetical sequence of blocks associated with the contacts.

18. The non-transitory storage device of claim 17, the instructions further comprising:

one or more instructions to associate the first graphic with an application, one or more instructions to detect a selection of the first graphic, and one or more instructions to launch the application based on the selection of the first graphic.

19. The non-transitory storage device of claim 17, the instructions further comprising:

one or more instructions to receive a user input;

one or more instructions to determine whether the user input is associated with a first position on the display or a second position on the display, the first position being different from the second position;

one or more instructions to anchor the rotatable multi-surface interface based on determining that the user input is associated with the first position; and one or more instructions to rotate the rotatable multi-surface interface based on determining that the user input is associated with the second position.

* * * * *